DEVICE FOR DETERMINING DIMENSIONAL REDUCTIONS AND ENLARGEMENTS

BACKGROUND OF THE INVENTION

The present invention relates to a device for determining dimensional reductions and enlargements of photographs, printed material and the like.

As is often the case in the printing industry, a photograph or a portion thereof must be enlarged or reduced when it is reproduced in a newspaper or magazine. In order that distortion of the photograph or design be prevented, it is necessary that the length as well as the width be reduced or enlarged proportionately.

Although the necessary computations for accomplishing the proportionate enlargement or reduction may be computed manually, this practice has proved to be unduly time consuming and open to error. Heretofore, manual computation has been avoided by resort to geometrical instruments which employ a movable member which must be maintained exactly diagonally across the enclosed rectangular area as the dimensions are increased or decreased. Another prior art device includes an adjustable masking frame assembly which overlies an appropriately scaled surface.

Although these instruments eliminate the necessity for manual computations, they often contain relatively complex mechanical arrangements thereby rendering them less rugged and more expensive to produce. Furthermore, there is no simple and accurate provision for reducing or enlarging the photograph by a predetermined factor without the necessity for manual computation.

OBJECTS OF THE INVENTION

It is, therefore, an object of this invention to provide a device for determining dimensional reductions and enlargements which is accurate and relatively easy to operate.

A further object of this invention is to provide a device for determining dimensional reductions and enlargements wherein the dimensions may be increased or decreased proportionately by a given percentage without a complex mechanical arrangement or the necessity for manual computation.

Another object of this invention is to provide a device for determining dimensional reductions and enlargements embodying durability of construction.

Another object of this invention is to provide a device for determining dimensional reductions and enlargements wherein the indicia is representative of the dimensions reduced or enlarged by a proportionate amount is located on a pair of movable members.

A further object of this invention is to provide a device for determining dimensional reductions and enlargements which is simple in construction.

A still further object of this invention is to provide a device for determining dimensional reductions and enlargements which permits the user to work from the layout to the photograph.

Yet another object is to permit the user to place the device directly on the layout once the photograph has been scaled.

SUMMARY OF THE INVENTION

The device comprises a first member having a pair of arms forming a right angle therebetween, a second member having a pair of arms forming a right angle therebetween, and means securing the first member to the second member to enclose a rectangular area within the arms. The means for securing the first member to the second member includes means for permitting relative movement therebetween to vary the size of the enclosed rectangular area. The first member carries indicia representing the length and width dimensions of the enclosed rectangular area as well as indicia representing the length and width enlarged or reduced by factors of varying degree.

DETAILED DESCRIPTION OF THE EMBODIMENT ILLUSTRATED IN THE DRAWINGS

Figure 1:
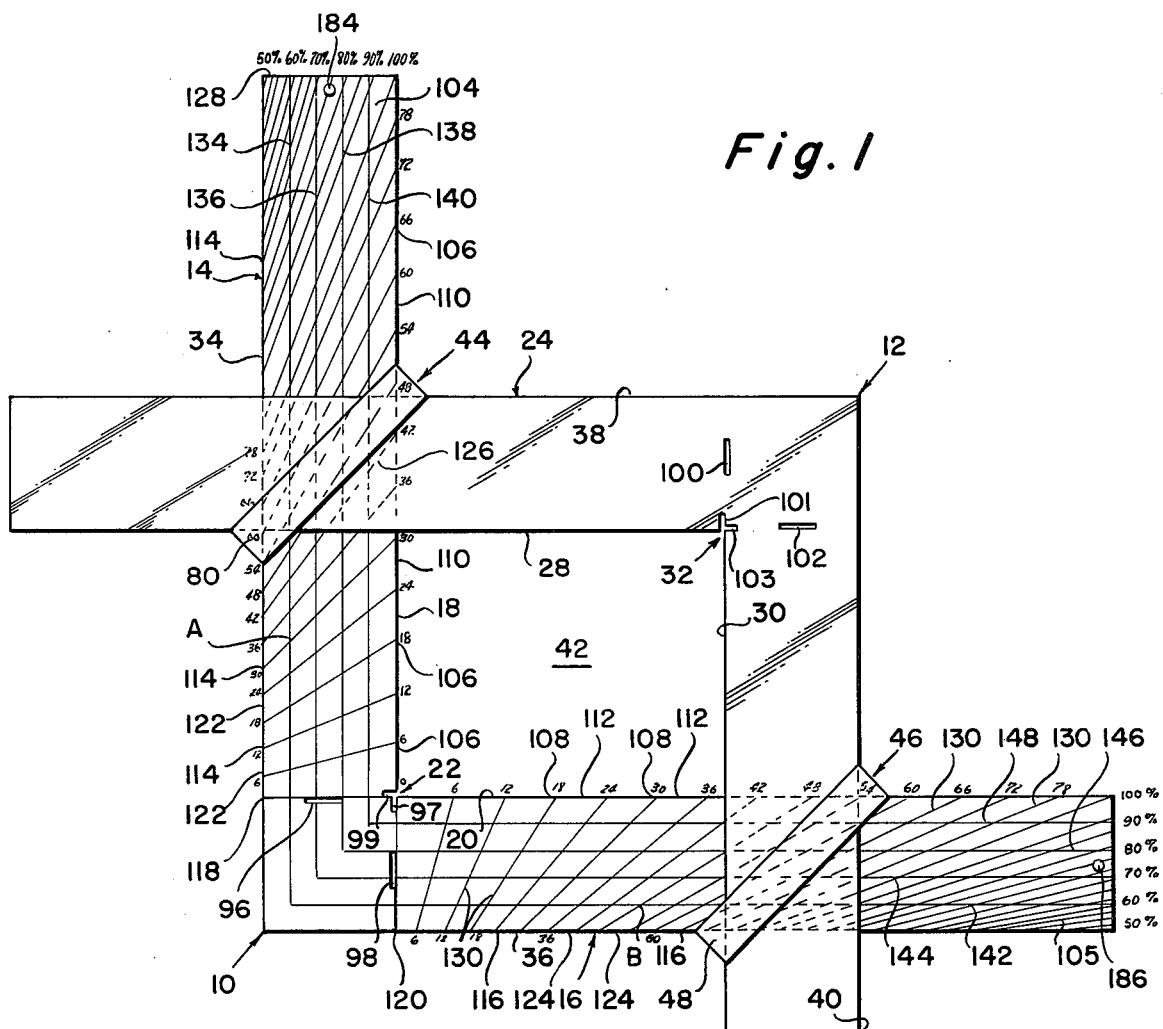
FIG. 1 is a top plan view of a preferred embodiment of the present invention.

In a preferred form, the device includes a pair of frame members 10 and 12 which are preferably made of a relatively thin transparent material such as a suitable plastic although strips of wood or metal could also be used. Member 10 comprises a pair of integral arms 14 and 16 oriented perpendicularly to each other such that their inside straightedges form a 90° angle at vertex 22. Similarly, the arms 24 and 26 of member 12 are perpendicular to each other and their inside straightedges 28 and 30 form a 90° angle at vertex 32. The outside straightedges 34, 36, 38 and 40 of members 10 and 12 are parallel to their respective inside edges 18, 20, 28 and 30.

Figure 2:
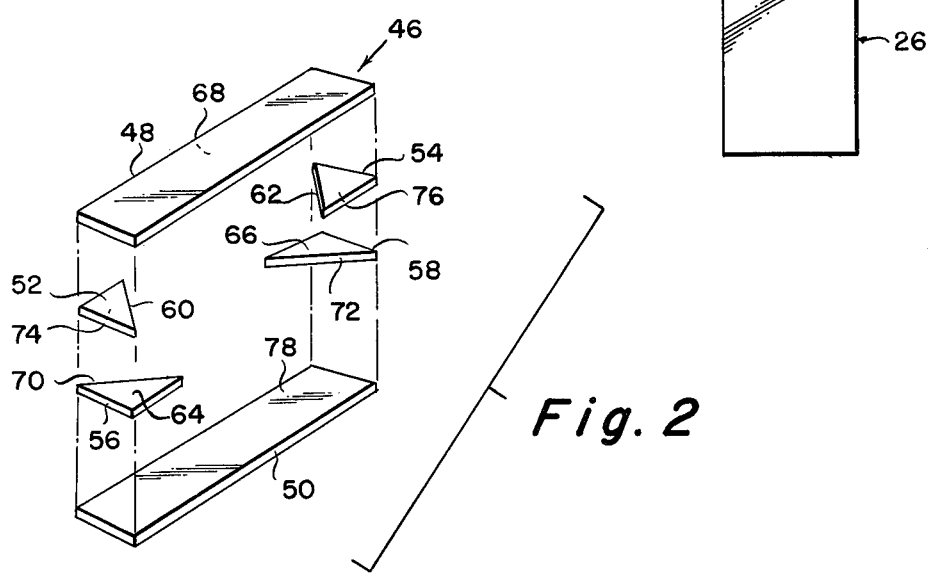
FIG. 2 is an exploded perspective view of one of the clips illustrated in FIG. 1 which forms a part of the present invention.
Figure 4:
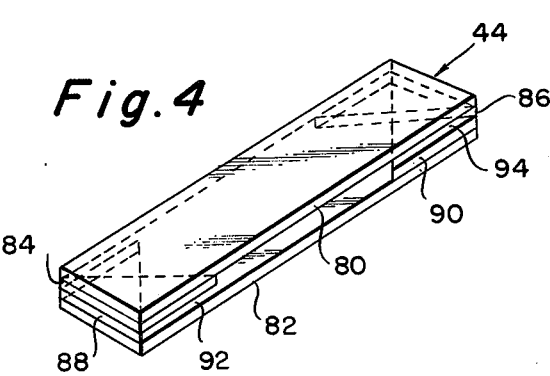
FIG. 4 is a perspective view of the other clip illustrated in FIG. 1 which forms a portion of the present invention.

Members 10 and 12 are secured together by means of clips 44 and 46 such that the inside edges 18, 20, 28 and 30 enclose a rectangular area 42. As is best illustrated in FIG. 2, clip 46 comprises a pair of transparent strip-like members 48 and 50 spaced from each other, when assembled, by triangular transparent members 52, 54, 56 and 58. When assembled, the clip 44 will appear as shown in FIG. 4 with the exception that the triangular members 52, 54, 46 and 58 will be arranged such that clip 46 is a mirror image of clip 44. The edges 60 and 62 of members 52 and 54, the upper surfaces 64 and 66 of members 56 and 58 and the lower surface 68 of member 48 cooperate to form a channel in which arm 26 slides rectilinearly. Similarly, the edges 70 and 72 of members 56 and 58, the lower surfaces 74 and 76 of members 52 and 54 and the upper surface 78 of member 50 cooperate to form a channel positioned below and oriented perpendicular to the aforementioned channel in which arm 16 slides rectilinearly in a direction perpendicular to the direction in which arm 26 slides.

Referring now to FIG. 4, clip 44 is illustrated in its assembled state. It comprises a pair of members 80 and 82 which are spaced from each other by means of triangular members 84, 86, 88 and 90, the latter being oriented in a reverse manner with respect to the triangular members 52, 54, 56 and 58 of clip 46. The triangular members 84, 86, 88 and 90 cooperate with members 80 and 82 to form a pair of channels 92 and 94 ori- 30 (e.g. graduation 48) is noted and member 12 moved toward arm 14 until edge 30 is aligned with the intersection of the line 130 corresponding to graduation 48 (line 48—48) and the 60 percent line 142 (point B). The width (28.8) may then be read on edge 20. The rectangular area 42 now enclosed by edges 18, 20, 28 and 30 has length and width dimensions which are exactly 60 percent of the rectangular area initially enclosed.

Figure 3:
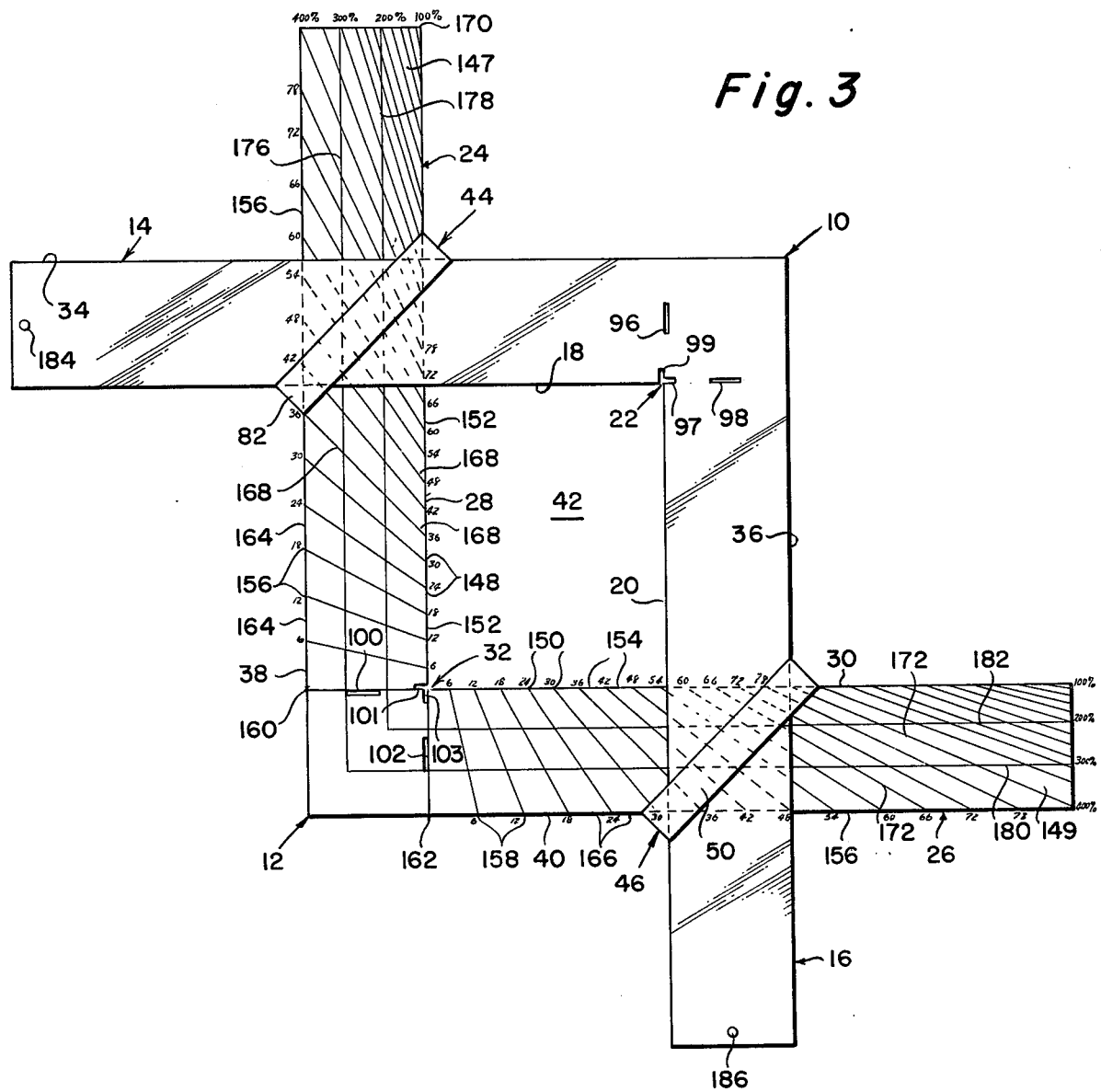
FIG. 3 is a bottom plan view of the embodiment illustrated in FIG. 1.

Should it be desired to enlarge the rectangular area 42 by a given percentage, the device is oriented such that the indicia on member 12 faces the user (FIG. 3). The edges 18, 20, 28 and 30 are again moved such that they enclose the portion of the photograph desired to be enlarged, the graduation 148 which is aligned with edge 18 is noted, the member 10 is moved away from arm 26 until it is aligned with the line 168 corresponding to the initial graduation 148 and the appropriate line 176, 178 or edge 156 corresponding to the desired degree of enlargement. Edge 20 is moved away from edge 28 in a similar fashion until the same degree of enlargement has been accomplished with respect to the width dimension.

In the case of reduction as well as enlargement, the area 42 enclosed by the edge 18, 20, 28 and 30 represents the initial area proportionately increased or decreased by a given factor.

Rather than increasing or decreasing the dimensions by a particular percentage, it may be desired to increase or decrease one of the dimensions to a specific value.

For example, assume that a rectangular area having a height 36 picas and a width 24 picas is desired to be reduced to a rectangular area having a height of 18 picas. Initially, member 12 is moved until edge 28 is aligned with the 36 graduation 106 and edge 30 is aligned with 24 graduation 108. Member 12 is then moved until edge 28 is aligned with the 18 graduation 108. The intersection of edge 28 and the 36—36 line is noted and by reference to the reduction indicia associated with lines 134, 136, 138 and edges 34 and 18, the percent of reduction is determined. In the present example, the intersection of edge 28 and the 36—36 line coincides with edge 34, a reduction of 50 percent. If, for example, the intersection would have lied on the 60 percent line 134, this would indicate a reduction of 40 percent. Edge 30 is then moved toward edge 18 until it is aligned with the intersection of the 24—24 line and the 50 percent edge 36. The point on edge 20 aligned with edge 30 would then indicate the width of the enclosed area 42 (i.e., 12 picas) corresponding to a height reduction of 18 picas.

By going through similar steps with the device oriented as illustrated in FIG. 3, enlargement could be accomplished.

Although the invention has been described by means of a particular embodiment wherein the dimensions can be reduced up to 50 percent in increments of 10 percent and enlarged by 400 percent in increments of 100 percent, it is possible to accomplish other degrees of enlargement or reduction by placing suitable indicia on members 10 and 12. For example, the segments 164 on edge 38 could be 7 or 10 times as large as the segments 152 on edge 28. Also, the number of parallel lines such as 176 and 178 could be increased or decreased and the values thereon adjusted accordingly.

While this invention has been described as having a preferred design, it will be understood that it is capable of further modification. This application is, therefore, intended to cover any variations, uses or adaptations of the invention following the general principles thereof and including such departures from the present disclosure as come within known or customary practice in the art to which this invention pertains and as may be applied to the essential features hereinbefore set forth and fall within the scope of this invention or the limits of the appended claims.

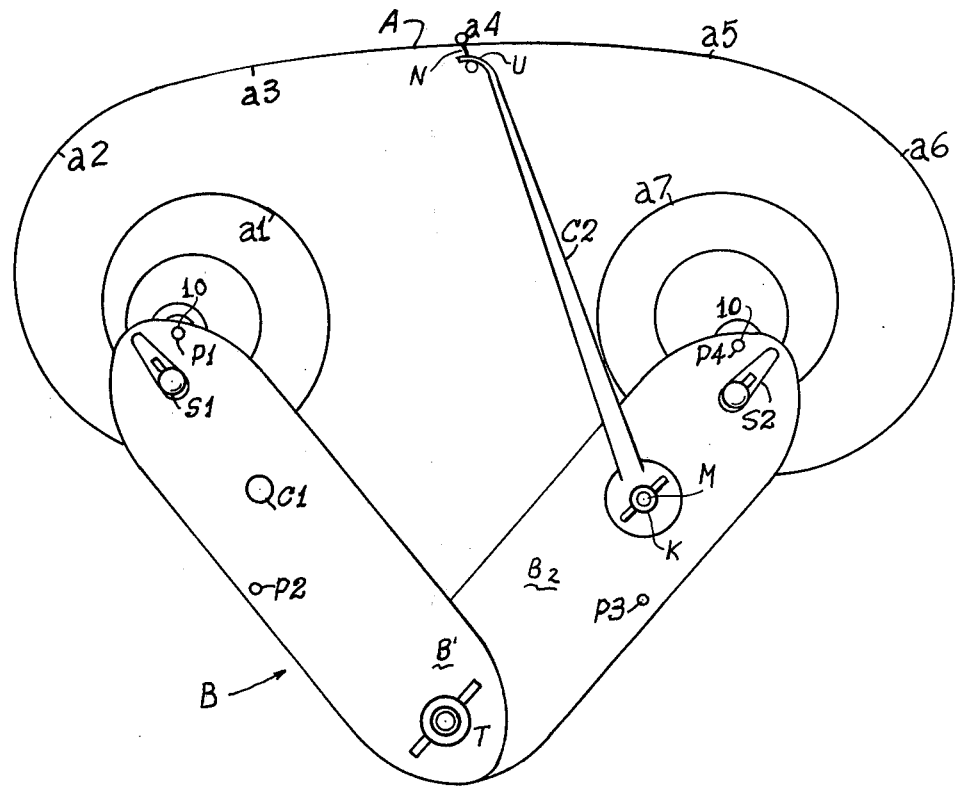

What is claimed is:

1. A device for determining dimensional reductions or enlargements comprising:
   a. a first member having a first pair of straight edges forming an inside 90° angle therebetween,
   b. said first member including a face adjacent said first pair of edges,
   c. a plurality of first longitudinal lines on said face parallel to and spaced from one of said first pair of edges,
   d. a plurality of first transverse lines extending from equally spaced positions along said one of said first pair of edges across said face in a fan-like manner to intersect said first longitudinal lines at positions equally spaced along each of said first longitudinal lines and wherein the spacing of said last mentioned positions along different of said first longitudinal lines is equal to the spacing of said positions along said one of said first pair of edges multiplied by differing factors of reduction or enlargement,
   e. a plurality of second longitudinal lines on said face parallel to and spaced from said the other of said first pair of edges,
   f. a plurality of second transverse lines extending from equally spaced positions along said the other of said first pair of edges across said face in a fan-like manner to intersect said second longitudinal lines at positions equally spaced along each of said second longitudinal lines and wherein the spacing of said last mentioned positions along different of said second longitudinal lines is equal to the spacing of said positions along said the other of said first pair of edges multiplied by differing factors of reduction or enlargement,
   g. indicia on said face associated with said transverse lines for identifying said transverse lines,
   h. indicia on said face associated with each of said longitudinal lines indicating the value of said factors of reduction or enlargement corresponding therewith,
   i. a second member having a second pair of straight edges forming an inside 90° angle therebetween, and
   j. means adjustably securing said first member to said second member in overlapping arrangement to enclose a rectangular area of adjustable size bordered by said edges,
   k. one of said second pair of edges extending across said plurality of first longitudinal lines and the other of said second pair of edges extending across said plurality of second longitudinal lines to serve as indexes for taking readings from the scales formed by said longitudinal and transverse lines.

2. The device of claim 1 and wherein:
   a. said transverse and longitudinal lines form a scale for determining dimensional reductions, b. said second member includes a face adjacent said second pair of edges and bearing transverse and longitudinal lines forming a scale for determining dimensional enlargements.

3. The device of claim 1 and wherein said means adjustably securing said members includes a clip slidably mounted on said members.

4. The device of claim 3 and wherein said clip includes means defining a channel for said first member to slide rectilinearly therein and means defining a channel for said second member to slide rectilinearly therein in a direction perpendicular to the direction of movement of said first member.

5. The device of claim 3 and wherein said means adjustably securing said members includes a pair of said clips.

6. The device of claim 3 and wherein said clip is transparent.

7. The device of claim 1 wherein said means adjustably securing said first member to said second member includes means for permitting rectilinear relative movement of said members.

8. The device of claim 3 and wherein said clip encircles a portion of each of said members.

* * * * *

United States Patent [19]
Arrieta

[11] 3,878,616
[45] Apr. 22, 1975

[54] DRAFTING INSTRUMENT

[76] Inventor: Daniel Aguilar Arrieta, P.O. (Apartado) 1929, San Jose, Costa Rica

[22] Filed: July 17, 1973

[21] Appl. No.: 379,996

[52] U.S. Cl. .................................. 33/177; 269/45
[51] Int. Cl. ............................................ B43l 13/20
[58] Field of Search ........ 33/179, 177, 176; 269/45, 269/275

[56] References Cited
UNITED STATES PATENTS

| | | | |
|---|---|---|---|
| 853,426 | 5/1907 | Steenstrup | 269/45 |
| 1,157,345 | 10/1915 | Toth | 33/177 |
| 1,689,234 | 10/1928 | Filzer | 33/177 |
| 2,138,494 | 11/1938 | Knox | 33/177 |
| 2,217,998 | 10/1940 | Buttress | 33/177 |
| 2,519,107 | 8/1950 | Brown | 269/275 |
| 2,813,710 | 11/1957 | Angle | 33/177 |

FOREIGN PATENTS OR APPLICATIONS
435,857   5/1948   Italy ....................... 33/177

*Primary Examiner*—Richard E. Aegerter
*Assistant Examiner*—John W. Shepperd
*Attorney, Agent, or Firm*—Hill, Gross, Simpson, San Santen, Steadman, Chiara & Simpson

[57] ABSTRACT

A drafting instrument comprising relatively adjustable divergent arms and a resiliently flexible spring tape having spirally curved end portions selectively engaged by the arms. A curvature control lever is engageable selectively with the spring tape to control in cooperation with the arms the curvilinear shape of the spring tape for tracing the selected curvilinear shape thus effected.

5 Claims, 8 Drawing Figures